(12) United States Patent
Schwan et al.

(10) Patent No.: US 9,360,102 B2
(45) Date of Patent: Jun. 7, 2016

(54) GEARING

(75) Inventors: Tobias Schwan, Wiesloch (DE); Jürgen Megerle, Forst (DE); Alexander Hüttinger, Neulingen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 915 days.

(21) Appl. No.: 13/054,711

(22) PCT Filed: Jul. 22, 2009

(86) PCT No.: PCT/EP2009/005312
§ 371 (c)(1),
(2), (4) Date: Jan. 18, 2011

(87) PCT Pub. No.: WO2010/009871
PCT Pub. Date: Jan. 28, 2010

(65) Prior Publication Data
US 2011/0146437 A1    Jun. 23, 2011

(30) Foreign Application Priority Data

Jul. 23, 2008 (DE) .......................... 10 2008 034 414

(51) Int. Cl.
*F16H 57/029* (2012.01)
*F16H 57/021* (2012.01)
*F16H 57/04* (2010.01)

(52) U.S. Cl.
CPC ............ *F16H 57/029* (2013.01); *F16H 57/021* (2013.01); *F16H 57/0423* (2013.01); *F16H 57/0493* (2013.01); *Y10T 74/19991* (2015.01)

(58) Field of Classification Search
USPC ...................... 74/467; 184/6.12; 277/301, 303
See application file for complete search history.

(56) References Cited

U.S. PATENT DOCUMENTS

| | | | | | |
|---|---|---|---|---|---|
| 1,810,372 A | * | 6/1931 | Hodgkinson | ................. | 277/419 |
| 2,075,532 A | * | 3/1937 | Mason | .......... | 384/466 |
| 3,214,989 A | * | 11/1965 | Wellauer et al. | ................ | 74/417 |
| 3,276,289 A | * | 10/1966 | Cox | ............................ | 74/606 R |
| 3,704,960 A | * | 12/1972 | Zagar | ............................ | 415/131 |
| 4,470,324 A | * | 9/1984 | Renk et al. | ................. | 74/606 R |

(Continued)

FOREIGN PATENT DOCUMENTS

| | | |
|---|---|---|
| DE | 198 55 970 | 6/2000 |
| DE | 101 20 419 | 3/2002 |
| DE | 10 2006 044 964 | 4/2008 |

OTHER PUBLICATIONS

Fluid Sealing Technologies, Heinz Muller—(Dekker Mechanical Engineering) 1998—p. 91.*

(Continued)

*Primary Examiner* — William Kelleher
(74) *Attorney, Agent, or Firm* — Kenyon & Kenyon LLP

(57) ABSTRACT

A gearing having a shaft that projects from the gear interior into the environment, the shaft being sealed with the aid of at least one contactless seal, and the opening of the contactless seal, which is oriented toward the interior of the gearing, i.e., the spatial region of the gearing that contains the lubricating oil, being disposed above the lubricating oil level that comes about when the gearing is not in operation, a tin piece being disposed between the opening and the gear-tooth piece situated closest to this opening and generating lubricating oil waves and/or lubricating oil foam from the lubricating oil bath.

17 Claims, 7 Drawing Sheets

(56) References Cited

U.S. PATENT DOCUMENTS

| | | | |
|---|---|---|---|
| 4,683,985 A * | 8/1987 | Hultgren | 184/6.12 |
| 4,892,000 A * | 1/1990 | Renk et al. | 74/467 |
| 5,676,221 A * | 10/1997 | Renk et al. | 184/6.12 |
| 6,058,793 A * | 5/2000 | Pasley et al. | 74/421 A |
| 6,918,492 B2 * | 7/2005 | Ostergaard | 209/326 |

OTHER PUBLICATIONS

13054711_20120515_NPL2_13054711_IMG_20.*
13054711_20120515_NPL1_13054711_IMG_20.*
International Search Report, issued in corresponding International Application No. PCT/EP2009/005312.

* cited by examiner

GEARING

FIELD OF THE INVENTION

The present invention relates to a gearing.

BACKGROUND INFORMATION

For gearings, it is known to seal shafts projecting from the gear housing with the aid of shaft sealing rings.

SUMMARY

Example embodiments of the present invention provide a gearing whose tightness is to be ensured, in particular in every installation position of the gearing.

Among features of example embodiments of the present invention in the gearing are that the gearing is implemented by a shaft that projects from the interior of the gearing into the environment, the shaft being sealed with the aid of at least one contactless seal, and the opening of the contactless seal, which is oriented toward the interior of the gearing, i.e., the spatial region of the gearing containing the lubricating oil, being disposed above the lubricant level that comes about when the gearing is not in operation, a tin piece being disposed between the opening and the gear-tooth piece situated closest to this opening and generating lubricating oil waves and/or lubricating oil foam from the lubricating oil bath.

In this context it is advantageous that protection of the seal from waves or foam generated during the operation is able to be provided. The tin piece may be formed such that the generated waves may exceed the height of the opening of the seal. With the aid of the tin piece, which preferably is implemented at an even greater height, the waves are deflectable from the opening and then are heavily damped on the path extended by the tin piece. Thus, the entry of lubricating oil into the contactless seal is able to be prevented.

In example embodiments, the shaft projects downward in the gravitation direction. In this context it is advantageous that the gearing is able to be arranged such that the shaft projects downward from the gear housing in the gravitation direction, yet the tightness is ensured nevertheless.

In example embodiments, the contactless seal is a labyrinth seal. This offers the advantage that a type of seal may be used that is easy to produce and functions in a contactless manner, i.e., without wear, and does not require any costly additional parts.

In example embodiments, the contactless seal is provided by a tubular piece which is slipped onto the shaft and a ram pipe which is connected to a gear housing component. In this context it is advantageous that the contactless seal is able to be produced by two parts that are easy to manufacture.

In example embodiments, the ram pipe has a drip edge, which in particular is provided on the same radius as an offset edge on the ram pipe. This offers the advantage that oil droplets may be spun off on the one hand, and the distance can be read out easily and clearly at the same time.

In example embodiments, the tin piece is connected to the ram pipe by welding. In this context it is advantageous that a connection may be used that is able to be produced in a simple and rapid manner. A hole in the tin piece, at whose edge region the welding is performed, is preferably provided for this purpose.

In example embodiments, the tin piece has a substantially planar or curved design. In this context it is advantageous that the tin piece, given a planar configuration, is easy to produce, and given a curved development, the tin piece is able to be adapted to the form of the toothed wheel of the preceding stage, thereby providing even better damping of the waves and the foam.

In example embodiments, a lamellar seal inside an annular groove is provided between the shaft and the tubular piece. This has the advantage that the sealing system is improved even further by providing a seal between shaft and tubular piece as well.

In example embodiments, an adjusting device for adjusting the position of the ram pipe is provided. This is advantageous insofar as the ram pipe is able to have only a short support in the gear housing, but a precise alignment of the ram pipe is achievable nevertheless. The adjustment device is preferably implemented by stud bolts.

In example embodiments, a seal, in particular an O-ring, is provided between the ram pipe and the lower part of the gear housing and/or the bearing supporting the shaft. This has the advantage of further improving the sealing system.

In example embodiments, a lid is placed atop the lower part of the gear housing and sealingly connected, which lid has at least one receptacle for shaft sealing rings, the shaft sealing rings providing sealing between the shaft and the lid. This had the advantage that additional shaft sealing rings are able to be provided.

In example embodiments, a dust lip is provided at the outer region of the shaft.

In example embodiments, a bearing supporting the shaft in the gear housing is provided in a grease chamber, or the bearing is lubricated with grease.

In example embodiments, a supply pipe for grease leading to the bearing, and a discharge pipe for grease are provided.

In example embodiments, the gear housing is formed in one piece or implemented as a lower part and an upper part.

Further features, aspects, and advantages are described in more detail below.

LIST OF REFERENCE NUMERALS

1 ram pipe
2 tubular piece
3 labyrinth seal
4 tin piece
5 recess provided in the tin for producing a welded connection
6 output shaft
7 shaft sealing ring
8 shaft sealing ring
9 bearing of the output shaft on the output side
10 second bearing of the output shaft
11 output toothed wheel of the penultimate stage of the gearing
12 drip edge
13 gear housing
14 O-ring seal
15 supply pipe for grease
16 discharge pipe for grease
17 adjusting device
18 step
19 lamellar ring
20 ram pipe
21 O-ring seal
22 lower part of gear housing
23 lamellar ring
30 lid
31 disk, screwed to lid 30
32 dust lip Example embodiments of the present invention will now be explained in greater detail with reference to the Figures.

DETAILED DESCRIPTION

Figure 1:
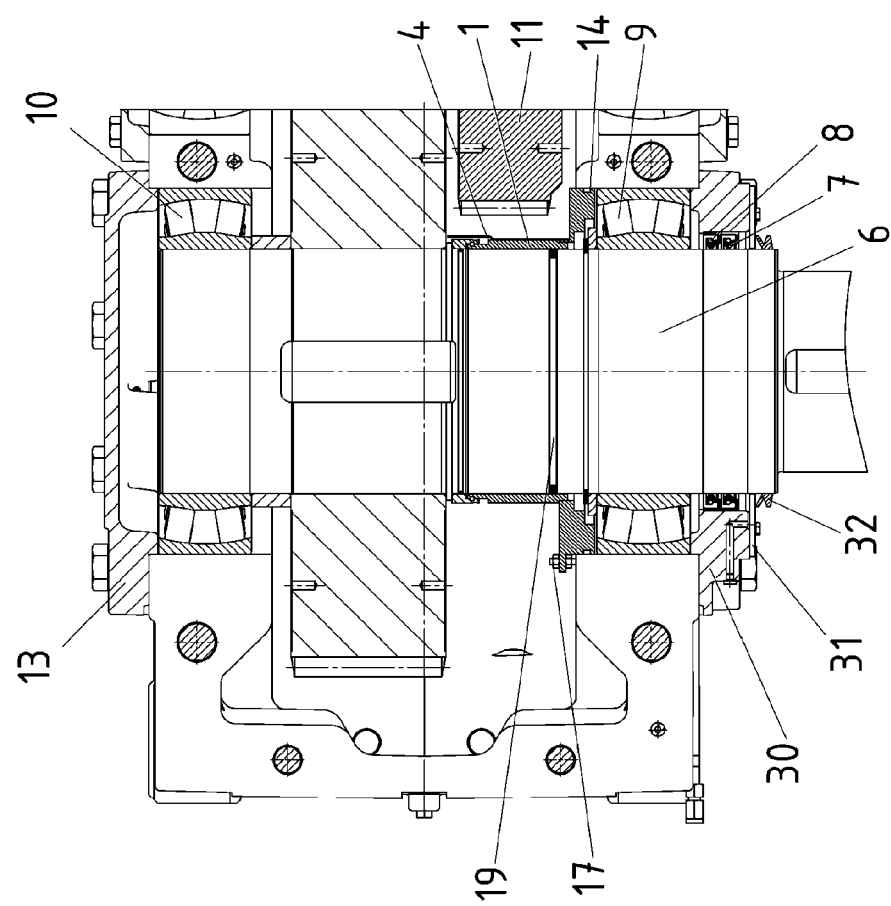
FIG. 1 shows an output-side region of a gearing according to an example embodiment of the present invention in a sectional view.

FIG. 1 shows a ram pipe 1, which is provided in a bore of gear housing 13 with the aid of O-ring seal 14, and is sealingly connected to the housing.

A bearing 9 of output shaft 6 is provided on the output side. This bearing 9 is lubricated by grease.

Thus, ram pipe 1 together with gear housing 13 forms a trough or a trough-shaped container filled with grease oil of the gearing, which lubricates the gear-tooth pieces of the gearing.

Figure 1A:
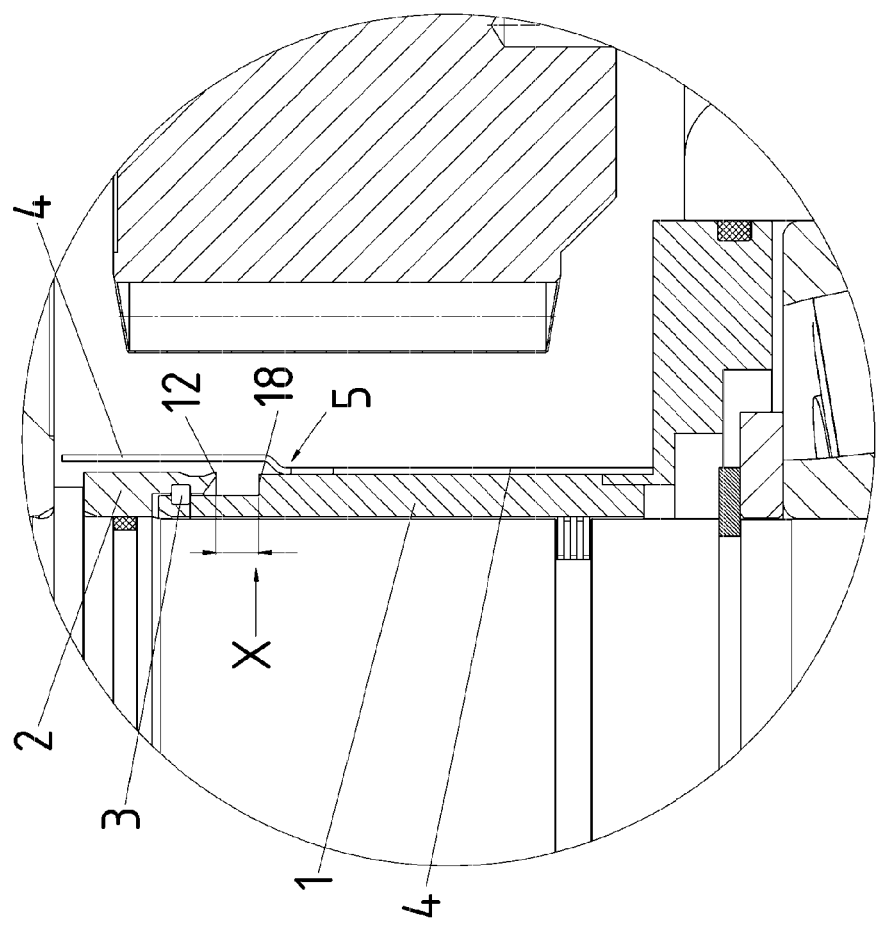
FIG. 1a shows an enlarged cutaway. The gear housing, especially the upper and lower side, is made from one piece.

A contactless seal, which preferably is implemented as labyrinth seal, is provided toward output shaft 6 supported in bearings 9 and 10. For this purpose, a tubular piece 2, which has low clearance relative to ram pipe 1 in the sealing region, is slipped over the output shaft. In the implementation of the labyrinth seal, this clearance region takes the form of a labyrinth. FIG. 1a shows a simple variant in which the seal has a small gap toward the gear interior and also toward the outside, a widened region being provided between the two gap regions.

For the further sealing of the output shaft projecting downward from the gear housing, that is to say, in the gravitation direction, two additional shaft sealing rings 7 and 8 are provided one after the other.

Furthermore, in an annular groove of output shaft 6, a lamellar ring 19 is provided between output shaft 6 and ram pipe 1 for sealing purposes.

Tubular piece 2 additionally has a drip edge 12 toward the gear interior, from which the lubricating oil is able to be spun off.

Figure 3:
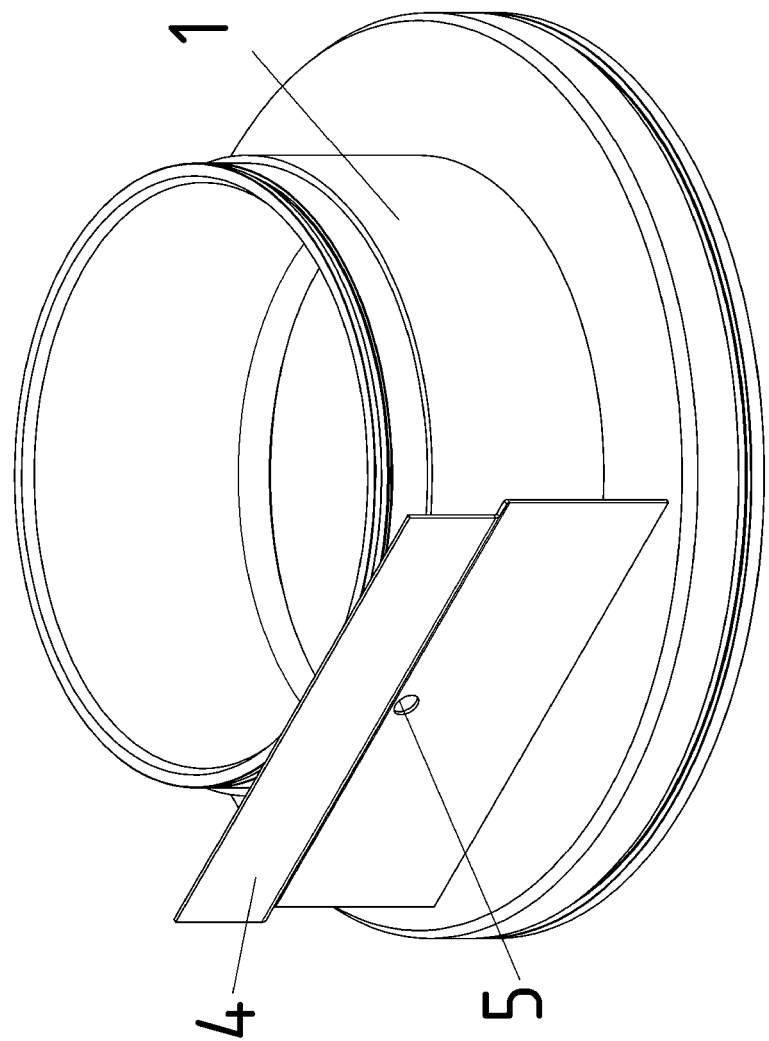
FIG. 3 shows tin piece 4 fixed in place on ram pipe 1.

Tin piece 4 is arranged in substantially planar form, as can also be gathered from FIGS. 1a and 3.

The fill level of the lubricant bath in the rest state is lower than the height of the opening area of the seal. Preferably, a safety distance of approximately 10 to 100 mm is maintained.

In this context it is important that tin piece 4 separates the entry opening, i.e., the opening region provided from the direction of the gear interior, of the seal to the adjacently disposed, rotatable gear-tooth pieces at least partially. FIG. 1 shows the toothed wheel, disposed on the output side, of the penultimate stage of the gearing. This toothed wheel 11 dips at least partially into the lubricant bath. When set into rotary motion, toothed wheel 11 and the gear-tooth piece engaging with it are lubricated. Furthermore, waves or even foam is generated in the lubricating grease bath. The height of the waves and/or foam may exceed the height of the entry opening of the seal.

However, tin piece 4 is disposed between toothed wheel 11, which is at least participating in producing the waves and/or the foam, and output shaft 6. The tin piece guides the waves and the foam away from the output shaft, so that the shortest route is blocked by tin piece 4. Preferably, the upper edge region of tin piece 4 projects beyond the maximally occurring wave height and foam height. The lower end of shaft piece 4 is provided below the level of lubricating oil that is present in the rest state.

As can be gathered quite clearly from FIGS. 1a and 3, tin piece 4 is preferably bent twice in order to produce an offset between a first planar subregion of the tin piece and a second subregion of the tin piece. This makes it possible to provide drip edge 12 and step 18 on the same radius. One advantage of this arrangement is that the distance from drip edge 12 to step 18 is able to be measured easily and clearly when the gearing is produced, and tubular piece 2 is therefore able to be positioned relative to ram pipe 1.

Tin piece 4 is welded to ram pipe 1. For this purpose a recess 5 is provided in tin piece 4, the edge region of recess 5 being joined to ram pipe 1 by welding. The welded connection is implemented in the center region of tin piece 4, so that it does not bend in the course of the welding operation. Recess 5 is preferably implemented as a round hole.

Figure 1B:
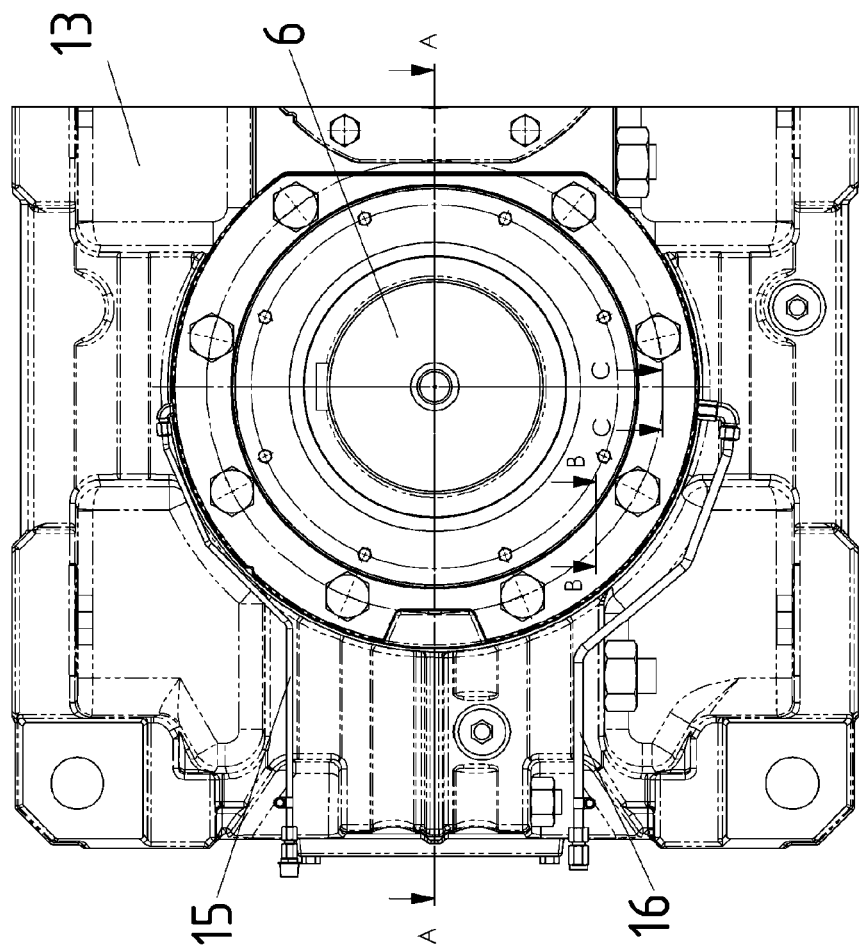

FIG. 1b shows a plan view of the gearing, in which supply pipe 15 for the supply of grease to the region of greased bearing 9 is shown. To avoid superpressure, a discharge pipe 16 is provided for discharging grease from this region. This region is arranged as a grease chamber, so to speak, and sealed with the aid of a lid 30 placed on top of the gear housing, which includes the shaft sealing seats for shaft sealing rings 7 and 8, and a disk 31, which is screwed to this lid 30 and covers the shaft sealing rings. In addition, a dust lip 32 for protection against rough dirt particles is provided outside of disk 31.

The position of ram pipe 1 is able to be adjusted with the aid of adjusting device 17. Adjusting device 17 is able to be realized, for example, by stud bolts provided at the periphery of the ram pipe. It has shown to be advantageous to provide three stud bolts along the periphery of the ram pipe, which are situated at a uniform distance from each other.

Lamellar ring 19 provided in an annular groove of the output shaft produces the tightness of the connection between output shaft 6 and ram pipe 1.

Figure 2:
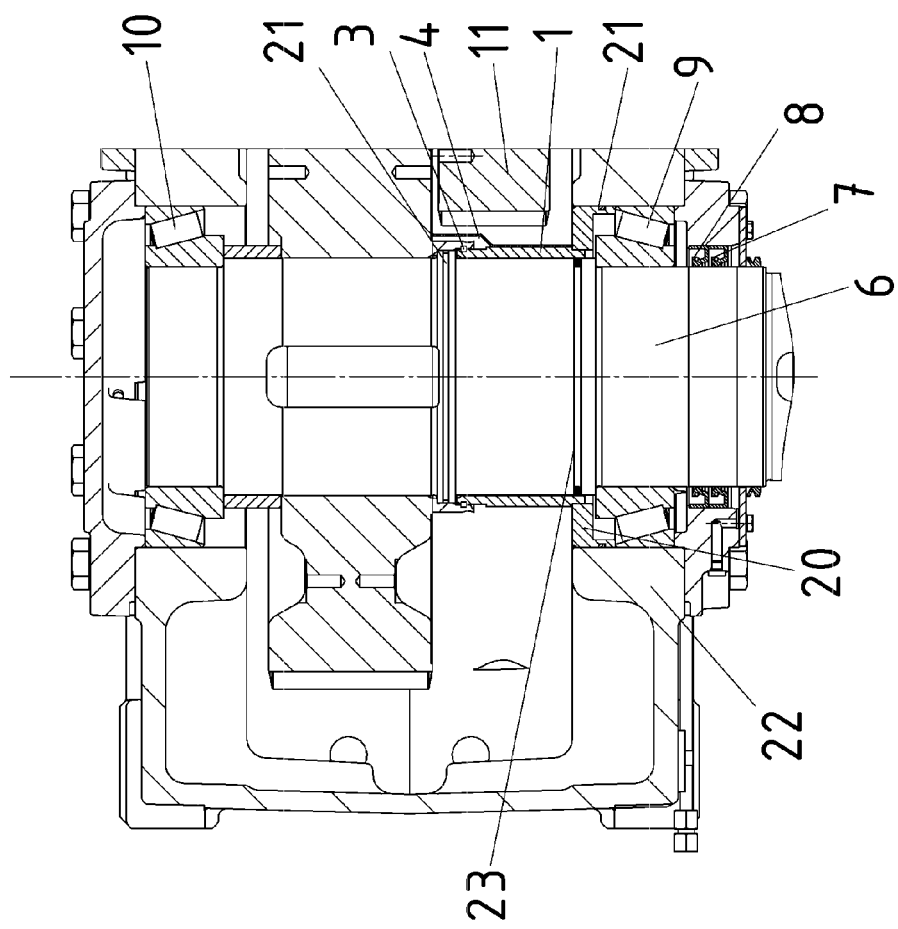
In FIG. 2, a similar gearing is made from a bipartite housing.
Figure 2A:
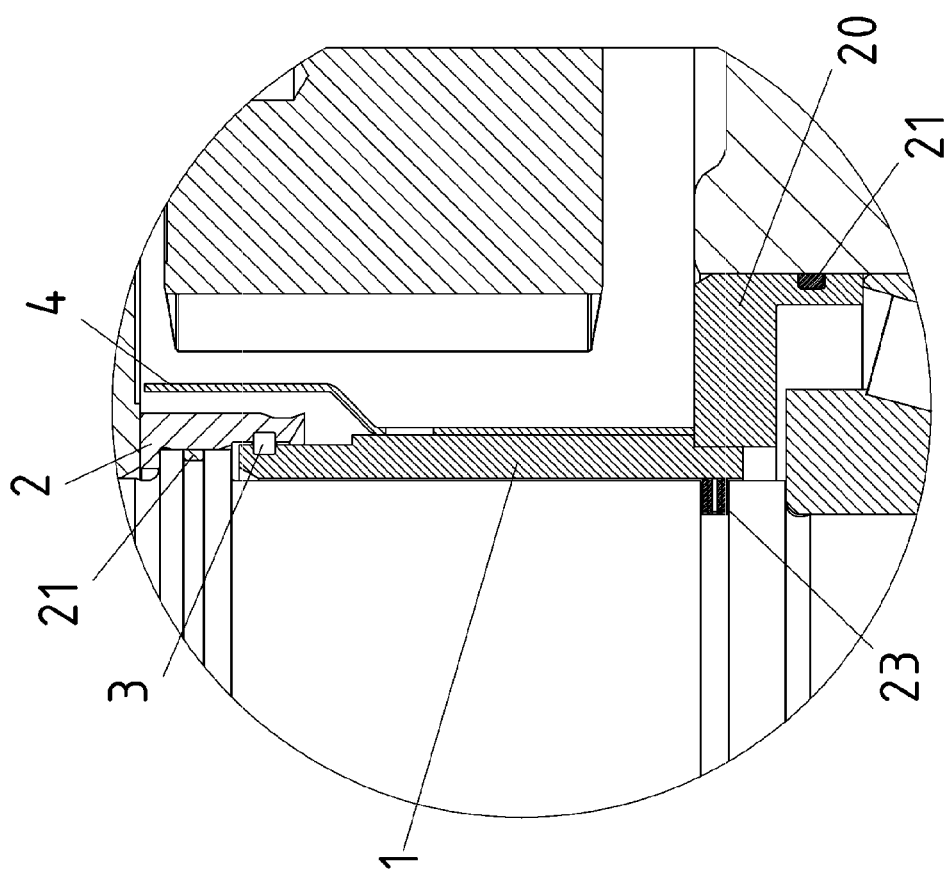
Figure 2B:
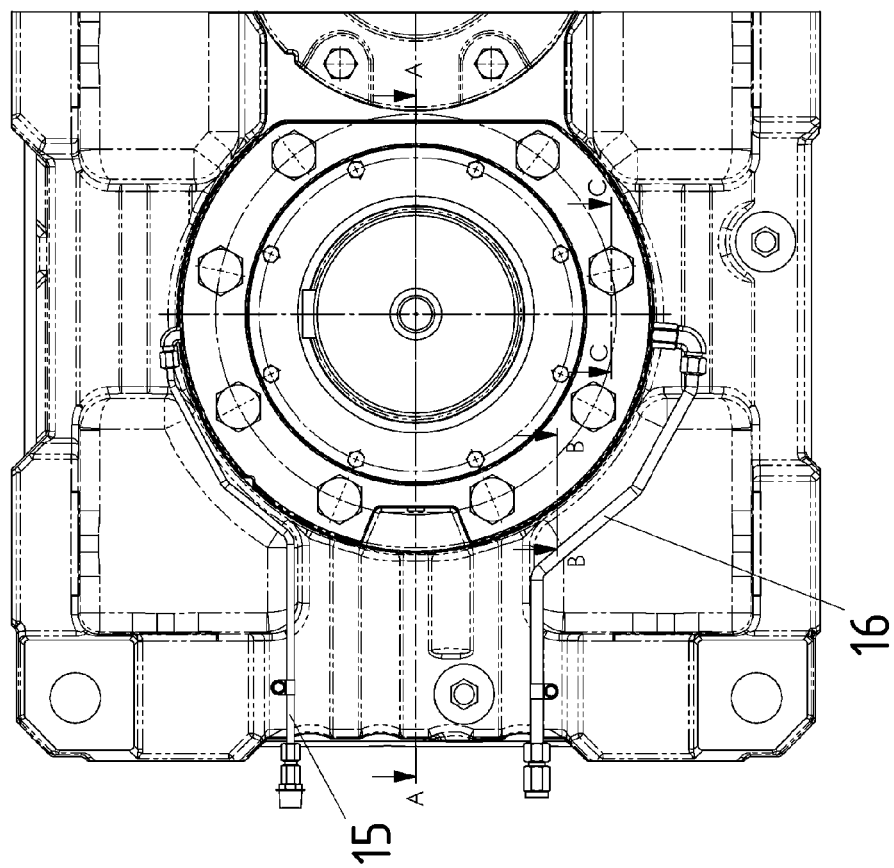

FIG. 2 shows an arrangement that is similar to the gearing according to FIG. 1; however, the housing is developed in two parts, i.e., a housing lower part and a housing upper part.

Furthermore, the connection between bearing 9 and ram pipe 20 is sealed by means of O-ring seal 21 in FIG. 2, and between ram pipe 20 and output shaft 6, by means of lamellar ring 23.

However, since the guidance of ram pipe 20 on lower part 22 of the gear housing may have greater axial length, no adjusting device 17 is necessary.

Tin piece 4, when fixed in place, fits through the bore in gear housing lower part 22 that accommodates bearing 9.

In additional exemplary embodiments, an intermediate shaft is used instead of the output shaft, or the input shaft having the sealing system according to the present invention, including the labyrinth seal, is used. The principle is also applicable to various types of shafts projecting from a housing.

In additional exemplary embodiments, the tin piece is preferably curved rather than essentially planar. Thus, the tin piece is able to be adapted roughly to the form of toothed wheel 11. As a result, tin piece 4 shields waves and foam from the direction of toothed wheel 11 more optimally, and the labyrinth seal is able to be protected even better.

The invention claimed is:
1. A gearing, comprising:
a shaft that projects from a gearing interior into the environment;

wherein the shaft is sealed by at least one contactless seal, and an opening of the contactless seal, which is oriented toward the gearing interior, is disposed above a lubricant oil level that comes about when the gearing is not in operation; and wherein a tin piece is disposed between the opening and a gear-tooth piece situated closest to the opening and adapted to generating at least one of (a) lubricating oil waves and (b) lubricating oil foam from the lubricating oil bath.

2. The gearing according to claim 1, wherein the gearing interior includes a spatial region of the gearing that contains the lubricating oil.

3. The gearing according to claim 1, wherein the shaft projects downward in a gravitation direction.

4. The gearing according to claim 1, wherein the contactless seal includes a labyrinth seal.

5. The gearing according to claim 1, wherein the contactless seal includes a tubular piece slipped over the shaft, and a ram pipe connected to a housing part of the gearing.

6. The gearing according to claim 5, wherein the tubular piece includes a drip edge.

7. The gearing according to claim 6, wherein the drip edge is provided on a same radius as a stepped edge of the ram pipe.

8. The gearing according to claim 5, wherein the protection piece is welded to the ram pipe.

9. The gearing according to claim 1, wherein the tin piece has at least one of (a) a substantially planar and (b) a curved configuration.

10. The gearing according to claim 5, further comprising a lamellar seal seated in an annular groove between the shaft and the tubular piece.

11. The gearing according to claim 5, further comprising an adjustment device adapted to adjust a position of the ram pipe.

12. The gearing according to claim 5, further comprising at least one of (a) a seal and (b) an O-ring between the ram pipe and at least one of (a) a lower part of a gearing housing and (b) a bearing supporting the shaft.

13. The gearing according to claim 1, further comprising a lid arranged on top of a lower part of the gearing housing and sealingly connected, the lid including at least one receptacle for shaft sealing rings, the shaft sealing rings adapted to seal the shaft from the lid.

14. The gearing according to claim 1, wherein a dust lip is provided in an outer region of the shaft.

15. The gearing according to claim 1, further comprising a bearing adapted to support the shaft in a gearing housing at least one of (a) arranged in a grease chamber and (b) lubricated with grease.

16. The gearing according to claim 1, further comprising a supply pipe adapted to supply grease for the bearing and a discharge pipe for grease.

17. The gearing according to claim 1, wherein a gear housing is at least one of (a) formed in one piece and (b) is formed of a lower part and an upper part.

* * * * *